(No Model.)
F. W. HUNTER.
ELECTRIC RAILWAY.
No. 584,873. Patented June 22, 1897.
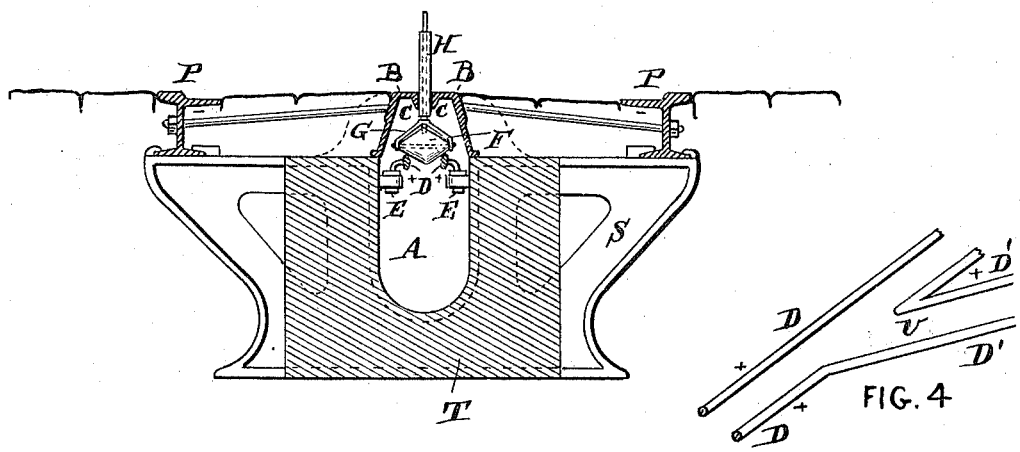
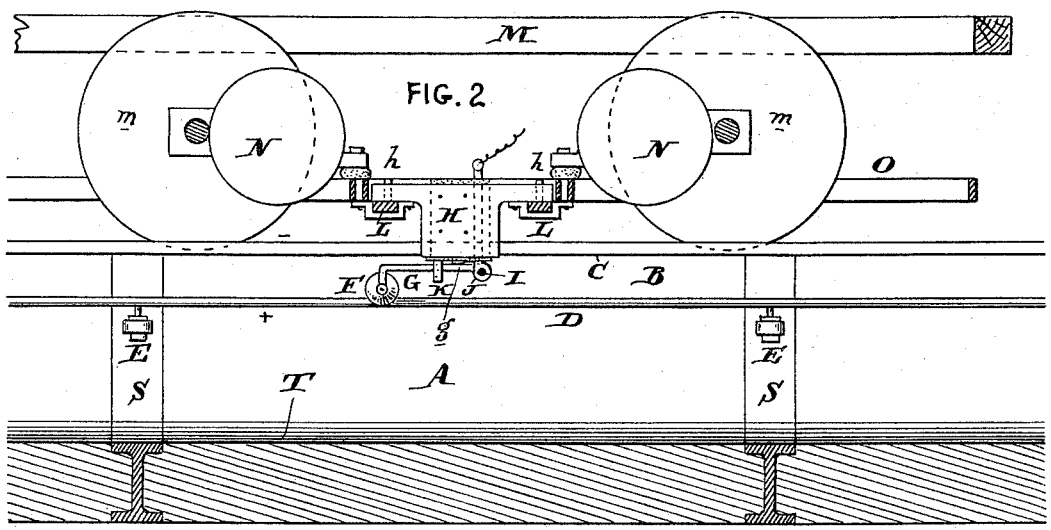
Attest
Wm. L. Evans
R. M. Kelly
Inventor
Frederic W. Hunter

UNITED STATES PATENT OFFICE.

FREDERIC WILLIAM HUNTER, OF CRANFORD, NEW JERSEY, ASSIGNOR TO NETTIE C. HUNTER, OF SAME PLACE.

ELECTRIC RAILWAY.

SPECIFICATION forming part of Letters Patent No. 584,873, dated June 22, 1897.

Application filed November 17, 1896. Serial No. 612,427. (No model.)

*To all whom it may concern:*

Be it known that I, FREDERIC WILLIAM HUNTER, of Cranford, State of New Jersey, have invented an Improvement in Electric Railways, of which the following is a specification.

My invention has reference to electric railways; and it consists of certain improvements which are fully set forth in the following specification and shown in the accompanying drawings, which form a part thereof.

Much difficulty has been experienced in conduit systems of electric railways from short-circuiting and consequent destruction and derangement of the equipment, including possible danger to the central-station or power-house machinery. Furthermore, the facility for switching and crossing, so simple and perfectly secured in the well-known overhead or trolley system, is not satisfactorily secured by any of the conduit systems heretofore proposed as far as I am aware.

The object of my invention is to overcome the above objections, and this I secure by employing the rails as the return and two parallel conductors of similar polarity within the conduit disposed relatively to each other and to the slot of the conduit that they come upon either side of a vertical plane dropped down from the slot, whereby the dripping of water or dirt is enabled to pass freely to the bottom of the conduit and without touching the positive conductor. Heretofore the positive conductor, when housed within the conduit, has been in the form of a single conductor and located directly below the slot, or if to one side necessitated the employment of a laterally-disposed collector, with the objectionable production of transverse strains. In most constructions heretofore proposed the feature of switching and crossing is not readily and satisfactorily secured, in my judgment, while it is perfectly accomplished by my improvement with about equal facility as that secured in the well-known trolley systems. In conjunction with my improved positive double conductor I employ a roller-contact made to rotate upon a horizontal axis and tapering at each end, so as in effect to have the equivalent of a flange or enlarged diameter which extends centrally between the two conductors. This roller-contact is carried by a suitable frame described hereinafter and supported by and moving with the car. When this roller-contact is required to move upon the conductors of a branch railway, it simply rolls onto the branching conductors with all the facility of the trolley, it being guided primarily by the car and slot of the conduit.

My invention will be better understood by reference to the accompanying drawings, in which—

Figure 1 is a cross-section through the conduit and road-bed of an electric railway embodying my improvements. Fig. 2 is a longitudinal section of same and also shows the car structure. Fig. 3 is a diagram showing the electric circuits, and Fig. 4 is a perspective view of the positive conductors at a branching track or railway.

A is the conduit structure, of any suitable construction. As shown, it consists of iron yokes S at intervals apart, to which the slot-irons B and rails P are secured. The sides and bottom of the conduit between the yokes are filled in with concrete T. The edges of the slot-irons adjacent to the slot are formed with downwardly-projecting flanges or lips C to insure the dropping of the water, mud, and dirt to take place at the center of the conduit and between the electric conductors, and also to present an extended surface to reduce the wear upon the collector-shank H.

D D are two parallel positive conductors, and are disposed one to each side of the slot, so as to be out of the path of the falling water, mud, &c., and are supported by suitable insulators E or in any other well-known manner. These conductors constitute two rails of a track, as it were, upon which the roller-contact F runs. This roller F is made of greatest diameter in the middle and tapers to each end and is adapted to rotate upon a horizontal axis and roll upon the conductors D D, as clearly shown in Fig. 1. The roller F is held in a forked arm G, pivoted at T to a downwardly-extending conductor J, carried by and insulated from the shank H of the collector. This gives to the arm G capacity for vertical movement, and it may move within a vertical guide K, which limits lateral movement. A spring $g$ may be employed to press the arm downward to insure a more positive contact of the roller upon the conductors D.

The shank H is supported upon pins $h$, projecting upwardly from laterally-adjustable bars L, movable in guides upon the independent frame O of the car M. The car-wheels $m$ act as the return collectors or contacts and make electrical contact with the rails P, which constitute the return or negative circuit. N are the electric motors, and may be mounted to operate the car, as is customary.

W is the dynamo or source of electric energy at the central station or power-house, and has its negative terminal connected with the rails and positive terminal connected with the two conductors D, as shown in Fig. 3. It is evident that the rails P might be used as the positive conductor and D D as the negative conductor, if so desired.

Q is the regulator on the car, and may be of any of the usual constructions.

R are the motor-circuits leading to the regulator.

S' is the conductor leading from the collector to the regulator, and R' is the conductor leading from the regulator to the wheels and axle.

It will be understood that in operation the arm G is to be formed with that looseness as to permit free lateral play as well as vertical movement, so as to permit the roller F to automatically adjust itself to the conductors D under all conditions and yet prevent excessive lateral play such as might permit the roller coming into contact with the sides of the slot-irons. If any water or slush drops upon the roller F, it naturally runs to the largest diameter and is thrown off between the conductors D.

Where the railway branches, as at U, the rails P' are in electrical connection with the rails P and the positive conductors D' connect with one of the conductors D, as shown in Figs. 3 and 4. It is preferable to break one of these conductors and connect its ends with the two conductors D', so as to offer no obstruction to the ready and free travel of the roller F from one set of conductors to the other. I have not shown the slot of the conduit, but that would be made in all material respects such as found in cable-roads.

While I prefer the construction shown, I do not confine myself to the details thereof, as they may be modified greatly without departing from the principles of my invention.

What I claim as new, and desire to secure by Letters Patent, is—

1. In an electric railway, the combination of a slotted conduit, two parallel insulated conductors of the same polarity suspended within the conduit and exposed on all sides, an electrically-propelled car, a collector device extending from the car into the conduit and a wide roller-contact journaled upon a transverse journal-bearing and resting upon the upper surfaces of both conductors, and a connection between the roller-contact and collector device permitting of free vertical motion to the roller to follow the vertical irregularities of the conductors.

2. In an electric railway, the combination of a slotted conduit, with two widely-separated conductors of the same polarity arranged one upon each side of a vertical plane through the slot and suspended within the conduit so as to form a clear space all around them, an electrically-propelled car, and a depending current-collecting device extending from the car through the slot of the conduit and terminating in a roller located wholly within the conduit journaled upon a transverse axis and making rolling contact simultaneously with both conductors.

3. In an electric railway, the combination of a slotted conduit, with two widely-separated conductors of the same polarity arranged one upon each side of a vertical plane through the slot and suspended within the conduit so as to form a clear space all around them, an electrically-propelled car, and a depending current-collecting device extending from the car through the slot of the conduit and terminating in a roller located wholly within the conduit journaled upon a transverse axis and formed with tapered ends making rolling contact simultaneously with both conductors and having its greatest diameter below the slot and between the conductors.

4. In an electric railway, the combination of a slotted conduit, with two widely-separated conductors of the same polarity arranged one upon each side of a vertical plane through the slot and suspended within the conduit so as to form an open clear space all around them, an electrically-propelled car, and a depending current-collecting device having provision for lateral motion extending from the car through the slot of the conduit and terminating in a vertically-movable roller located wholly within the conduit journaled upon a transverse axis and making rolling contact simultaneously with both conductors.

5. In an electric railway, the combination of a slotted conduit, with two widely-separated conductors of the same polarity arranged one upon each side of a vertical plane through the slot and suspended within the conduit so as to form a clear space all around them, an electrically-propelled car, and a depending current-collecting device extending from the car through the slot of the conduit and terminating in a roller located wholly within the conduit journaled upon a transverse axis and making rolling contact simultaneously with both conductors, the rails acting as the return-conductor, electric circuits leading from the current-collecting device to the wheels of the car and including the motors, and a regulator to control the speed of the motors.

6. In an electric railway, the combination of a slotted conduit having its edges formed with depending flanges or lips, with two widely-separated conductors of the same polarity arranged one upon each side of a vertical plane through the slot and supported within the conduit so as to form an open clear space all around them, an electrically-propelled car, and a depending current-collecting device extending from the car through the slot of the conduit and terminating in a roller journaled upon a transverse axis and making rolling contact simultaneously with both conductors, the rails acting as the return-conductor, electric circuits leading from the current-collecting device to the wheels of the car and including the motors, and a regulator to control the speed of the motors.

7. In an electric railway, the combination of the rails of a main track and branching track acting as a conductor of one polarity, with two parallel widely-separated conductors for the main track and two similar widely-separated parallel conductors for the branching track acting as the conductor of the other polarity, said conductors being supported with the conduit so as to form a clear unobstructed space all around them, a source of electrical energy having its terminals respectively connected to the rails and conductors, an electrically-propelled car running upon the rails and provided with a wide roller-contact adapted to maintain contact with the two conductors of either the main or branching track and roll freely from one pair of said conductors to the other.

In testimony of which invention I have hereunto set my hand.

FREDERIC WILLIAM HUNTER.

Witnesses:
KATHERINE WALSH,
PHILIP A. SMYTH.